United States Patent [19]
Willis, Jr. et al.

[11] Patent Number: 5,861,363
[45] Date of Patent: Jan. 19, 1999

[54] POLYALKYLENE SUCCINIMIDE COMPOSITION USEFUL IN INTERNAL COMBUSTION ENGINES

[75] Inventors: William W. Willis, Jr., Pinole; Robert L. Freerks, Martinez, both of Calif.

[73] Assignee: Chevron Chemical Company LLC, San Francisco, Calif.

[21] Appl. No.: 15,801

[22] Filed: Jan. 29, 1998

[51] Int. Cl.[6] ........................ C10M 141/12; C10M 149/14
[52] U.S. Cl. .......................... 508/192; 508/222; 508/287
[58] Field of Search ................................... 508/192, 222, 508/287

[56] References Cited

U.S. PATENT DOCUMENTS

| | | | |
|---|---|---|---|
| 3,018,250 | 1/1962 | Anderson et al. | 252/51.5 |
| 3,172,892 | 3/1965 | LeSuer et al. | 260/326.5 |
| 3,219,666 | 11/1965 | Norman et al. | 260/268 |
| 3,361,673 | 1/1968 | Stuart et al. | 252/51.5 |
| 3,381,022 | 4/1968 | LeSuer | 260/404.8 |
| 3,912,764 | 10/1975 | Palmer, Jr. | 260/346.8 |
| 4,234,435 | 11/1980 | Meinhardt et al. | 252/51.5 A |
| 4,612,132 | 9/1986 | Wollenberg et al. | 252/51.5 A |
| 4,747,965 | 5/1988 | Wollenberg et al. | 252/51.5 A |
| 5,112,507 | 5/1992 | Harrison | 252/51.5 A |
| 5,241,003 | 8/1993 | Degonia et al. | 525/123 |
| 5,266,186 | 11/1993 | Kaplan | 208/48 AA |
| 5,286,799 | 2/1994 | Harrison et al. | 525/285 |
| 5,308,521 | 5/1994 | Pavilon et al. | 508/192 |
| 5,319,030 | 6/1994 | Harrison et al. | 525/285 |
| 5,334,321 | 8/1994 | Harrison et al. | 252/51.5 A |
| 5,356,552 | 10/1994 | Harrison et al. | 252/51.5 A |
| 5,631,212 | 5/1997 | Urahopoulou | 508/192 |
| 5,658,862 | 8/1997 | Urahopoulou | 508/192 |
| 5,716,912 | 2/1998 | Harrison et al. | 508/192 |
| 5,753,597 | 5/1998 | Harrison et al. | 508/192 |

*Primary Examiner*—Jacqueline V. Howard
*Attorney, Agent, or Firm*—Ernest A. Schaal

[57] ABSTRACT

A lubricating oil composition for internal combustion engines giving improved soot dispersancy. That lubricating oil composition has a mixture of borated and carbonated polyalkylene succinimides derived from different molecular weight polyalkylenes. The molecular weight of the polyalkylenes from which the carbonated polyalkylene succinimide is derived is at least 300 greater than the molecular weight of the polyalkylenes from which the borated polyalkylene succinimide is derived.

9 Claims, No Drawings

5,861,363

POLYALKYLENE SUCCINIMIDE COMPOSITION USEFUL IN INTERNAL COMBUSTION ENGINES

The present invention relates to novel compositions comprising mixtures of post-treated derivatives of polyalkylene succinimides. In a further aspect, the invention relates to methods of preparing these compositions and their uses as dispersants in lubricating oils. In another aspect, the invention relates to concentrates and lubricating oil compositions.

BACKGROUND OF THE INVENTION

Lubricating oil compositions for internal combustion engines generally contain a variety of additives to reduce or control deposits, wear, corrosion, etc. The present invention is concerned with compositions useful as dispersants in lubricating oil compositions.

In lubricating oils, dispersants function to control sludge, carbon, and varnish produced primarily by the incomplete combustion of the fuel, or impurities in the fuel, or impurities in the base oil used in the lubricating oil composition. Dispersants also control viscosity increase due to the presence of soot in diesel engine lubricating oils.

One of the most effective classes of lubricating oil dispersants is polyalkylene succinimides. In some cases, the succinimides have also been found to provide fluid-modifying properties, or a so-called viscosity index credit, in lubricating oil compositions. That produces a reduction in the amount of viscosity index improver which would be otherwise have to be used.

Polyalkylene succinimides are generally prepared by the reaction of the corresponding polyalkylene succinic anhydride with a polyalkyl polyamine. Polyalkylene succinic anhydrides are generally prepared by a number of well-known processes. For example, there is a well-known thermal process (see, e.g., U.S. Pat. No. 3,361,673), an equally well-known chlorination process (see, e.g., U.S. Pat. No. 3,172,892), a combination of the thermal and chlorination processes (see, e.g., U.S. Pat. No. 3,912,764), and free radical processes (see, e.g., U.S. Pat. Nos. 5,286,799 and 5,319,030). Such compositions include one-to-one monomeric adducts (see, e.g., U.S. Pat. Nos. 3,219,666 and 3,381,022), as well as "multiply adducted" products, adducts having alkenyl-derived substituents adducted with at least 1.3 succinic groups per alkenyl-derived substituent (see, e.g., U.S. Pat. No. 4,234,435).

U.S. Pat. Nos. 3,361,673 and 3,018,250 describe the reaction of an alkenyl- or alkyl-substituted succinic anhydride with a polyamine to form alkenyl or alkyl succinimide lubricating oil dispersants and/or detergent additives.

U.S. Pat. No. 4,612,132 teaches that alkenyl or alkyl succinimides may be modified by reaction with a cyclic or linear carbonate or chloroformate such that one or more of the nitrogens of the polyamine moiety is substituted with a hydrocarbyl oxycarbonyl, a hydroxyhydrocarbyl oxycarbonyl, or a hydroxy poly(oxyalkylene) oxycarbonyl. These modified succinimides are described as exhibiting improved dispersancy and/or detergency in lubricating oils.

U.S. Pat. No. 4,747,965 discloses modified succinimides similar to those disclosed in U.S. Pat. No. 4,612,132, except that the modified succinimides are described as being derived from succinimides having an average of greater than 1.0 succinic groups per long chain alkenyl substituent.

An article by S. T. Roby, R. E. Kornbrekke, and J. A. Supp "Deposit Formulation in Gasoline Engines, Part 2, Dispersant Effects on Sequence VE Deposits" JOURNAL OF THE SOCIETY OF TRIBOLOGISTS AND LUBRICATION ENGINEERS, Vol. 50, 12, 989–995 (December 1994) teaches that the length of the dispersant alkyl side chain influences deposit control performance, and that, at the same nitrogen level, the low molecular weight (side chain 1000 daltons) dispersants that were tested were poorer in controlling deposits than the tested high molecular weight (side chain 2000 daltons) succinimide dispersants. This teaching is also consistent with the prior observation comparing 950 Mn side chain succinimides with 2200 Mn side chain succinimides.

U.S. Pat. No. 4,234,435 teaches a preferred polyalkene-derived substituent group with a Mn in the range of 1500 to 3200. For polybutenes, an especially preferred Mn range is 1700 to 2400.

A variety of post-treatments for improving various properties of alkenyl succinimides are known to the art, a number of which are described in U.S. Pat. No. 5,241,003.

Example 2 of U.S. Pat. No. 5,266,186 discloses the preparation of dispersants by reacting certain polyisobutenyl-succinic anhydride adducts (see footnote 2 of Table 2) with ethylenediamine, followed by reaction with a maleic anhydride/α-olefin copolymer. The patent teaches that, by functioning as an iron sulfide dispersant, the product is useful to inhibit sludge deposits in refinery processing equipment caused by the heat treatment of hydrocarbon feed stocks.

U.S. Pat. No. 5,112,507 discloses a polymeric ladder type polymeric succinimide dispersant in which each side of the ladder is a long chain alkyl or alkenyl, generally having at least about 30 carbon atoms, preferably at least about 50 carbon atoms. The dispersant is described as having improved hydrolytic stability and shear stress stability, produced by the reaction of certain maleic anhydride-olefin copolymers with certain polyamines. The patent further teaches that the polymer may be post-treated with a variety of post-treatments, and describes procedures for post-treating the polymer with cyclic carbonates, linear mono- or polycarbonates; boron compounds (e.g., boric acid), and fluorophosphoric acid and ammonia salts thereof.

U.S. Pat. Nos. 5,334,321 and 5,356,552 disclose certain cyclic carbonate post-treated alkenyl or alkylsuccinimides having improved fluorocarbon elastomer compatibility, which are preferably prepared by the reaction of the corresponding substituted succinic anhydride with a polyamine having at least four nitrogen atoms per mole. Both of these patents disclose the possibility of borating certain cyclic carbonate post-treated alkenyl or alkylsuccinimides.

U.S. Pat. No. 5,334,321 discloses that higher molecular weight alkenyl or alkylsuccinimides give better detergency than the corresponding lower molecular weight alkenyl or alkylsuccinimides.

Mixtures of borated and carbonated polyalkylene succinimides have been derived from the same molecular weight polyalkylenes. The mixtures show inferior soot dispersancy to the individual borated and carbonated polyalkylene succinimides used alone.

U.S. Pat. No. 5,716,912 discloses polyalkylene succinimides prepared by reacting, under reactive conditions, a mixture of a polybutene succinic acid derivative, an unsaturated acidic reagent copolymer of an unsaturated acidic reagent and an olefin, and a polyamine, then treating those succinimides with cyclic carbonates, linear mono- or polycarbonates or a boron compound.

SUMMARY OF THE INVENTION

The present invention provides a polyalkylene succinimide composition that improves the soot dispersancy properties of a lubricating oil composition. This polyalkylene succinimide composition comprises borated and carbonated polyalkylene succinimides derived from different molecular weight polyalkylenes.

The polyalkylene succinimide composition comprises from 10% to 50% of a boron-treated polyalkylene succinimide and from 50% to 90% of a carbonate-treated polyalkylene succinimide. This polyalkylene succinimide composition produces superior soot dispersancy to either the boron-treated polyalkylene succinimide or the carbonate-treated polyalkylene succinimide when used alone.

The boron-treated polyalkylene succinimide is derived from polyalkylenes having a lower molecular weight than the polyalkylenes from which the carbonate-treated polyalkylene succinimide is derived. This difference in molecular weight is at least 300, preferably from 800 to 1000.

Preferably, the boron-treated polyalkylene succinimide is a polybutene succinimide derived from polybutenes having a molecular weight of from 1200 to 1400 and the carbonate-treated polyalkylene succinimide is a polybutene succinimide derived from polybutenes having a molecular weight of from 2000 to 2400. Preferably, the carbonate-treated polybutene succinimide is prepared by reacting, under reactive conditions, a mixture of a polybutene succinic acid derivative, an unsaturated acidic reagent copolymer of an unsaturated acidic reagent and an olefin, and a polyamine.

The soot dispersancy of a lubricating oil in internal combustion engine applications can be improved by adding to that lubricating oil an effective amount of the polyalkylene succinimide composition of the present invention.

The present invention further provides lubricating oil compositions having a major amount of a base oil of lubricating viscosity, the polyalkylene succinimide composition of the present invention (1% to 20%), and preferably at least one of the following: detergent (<30%), zinc dithiophosphate (<5%), oxidation inhibitor (<10%), foam inhibitor (<1%), and viscosity index improver (<20%).

The invention also provides a concentrate comprising the polyalkylene succinimide composition of the present invention, an organic diluent, and preferably at least one other additive. The organic diluent constitutes from 1% to 20% of the concentrate, and the polyalkylene succinimide composition constitutes about 5% to 80% of the concentrate.

DETAILED DESCRIPTION OF THE INVENTION

In its broadest aspect, the present invention involves a polyalkylene succinimide composition that comprises a mixture of borated and carbonated polyalkylene succinimides derived from different number average molecular weight polyalkylenes.

Definitions

As used herein the following terms have the following meanings unless expressly stated to the contrary:

The term "succinimide" is understood in the art to include many of the amide, imide, etc. species that are also formed by the reaction of a succinic anhydride with an amine. The predominant product, however, is succinimide and this term has been generally accepted as meaning the product of a reaction of an alkenyl- or alkyl-substituted succinic acid or anhydride with a polyamine. Alkenyl or alkyl succinimides are disclosed in numerous references and are well known in the art. Certain fundamental types of succinimides and related materials encompassed by the term of art "succinimide" are taught in U.S. Pat. Nos. 2,992,708; 3,018,291; 3,024,237; 3,100,673; 3,219,666; 3,172,892; and 3,272,746, the disclosures of which are hereby incorporated by reference in their entirety for all purposes.

The term "polyalkylene succinic acid derivative" refers to a structure having the formula

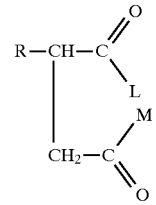

wherein R is a polyalkylene, and L and M are independently selected from the group consisting of —OH, —Cl, —O—, lower alkyl or taken together are —O— to form an alkenyl or alkylsuccinic anhydride group.

The term "unsaturated acidic reagent" refers to maleic or fumaric reactants of the general formula:

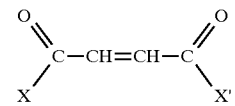

wherein X and X' are the same or different, provided that at least one of X and X' is a group that is capable of reacting to esterify alcohols, form amides, or amine salts with ammonia or amines, form metal salts with reactive metals or basically reacting metal compounds, and otherwise function as acylating agents. Typically, X and/or X' is —OH, —O-hydrocarbyl, —OM$^+$ where M$^+$ represents one equivalent of a metal, ammonium or amine cation, —NH$_2$, —Cl, —Br, and taken together X and X' can be —O— so as to form an anhydride. Preferably, X and X' are such that both carboxylic functions can enter into acylation reactions. Maleic anhydride is a preferred unsaturated acidic reactant. Other suitable unsaturated acidic reactants include electron-deficient olefins such as monophenyl maleic anhydride; monomethyl, dimethyl, monochloro, monobromo, monofluoro, dichloro and difluoro maleic anhydride; N-phenyl maleimide and other substituted maleimides; isomaleimides; fumaric acid, maleic acid, alkyl hydrogen maleates and fumarates, dialkyl fumarates and maleates, fumaronilic acids and maleanic acids; and maleonitrile, and fumaronitrile.

Unless otherwise specified, all molecular weights are number average molecular weights (Mn).

Unless otherwise specified, all percentages are in weight percent and are based on the amount of active and inactive components, including any process oil or diluent oil used to form that component.

Polyalkylene Succinimide Composition

The polyalkylene succinimide composition of the present invention comprises from 10% to 50% of a boron-treated polyalkylene succinimide derived from a lower molecular weight polyalkylene and from 50% to 90% of a carbonate-treated polyalkylene succinimide derived from a higher molecular weight polyalkylene. Preferably, the polyalkylene succinimide composition of the present invention comprises from 20% to 40% of the boron-treated polyalkylene succinimide and from 60% to 80% of the carbonate-treated polyalkylene succinimide. This polyalkylene succinimide composition produces superior soot dispersancy to either the boron-treated polyalkylene succinimide or the carbonate-treated polyalkylene succinimide when used alone. The advantages of the boron-treated polyalkylene succinimide in TBN contribution and prevention of bearing corrosion are also preserved.

The individual polyalkylene succinimides used in the polyalkylene succinimide composition of the present invention can be prepared by conventional processes, such as disclosed in U.S. Pat. Nos. 2,992,708; 3,018,250; 3,018,291; 3,024,237; 3,100,673; 3,172,892; 3,219,666; 3,272,746; 3,361,673; 3,381,022; 3,912,764; 4,234,435; 4,612,132; 4,747,965; 5,112,507; 5,241,003; 5,266,186; 5,286,799; 5,319,030; 5,334,321; 5,356,552; 5,716,912, the disclosures of which are all hereby incorporated by reference in their entirety for all purposes.

The polyalkylene succinimide composition can be prepared by physically mixing the boron-treated polyalkylene succinimide and the carbonate-treated polyalkylene succinimide. The polyalkylene succinimide composition might have a slightly different composition than the initial mixture, because the components may interact.

Boron-Treated Polyalkylene Succinimide

The polyalkylene succinimide composition comprises from 10% to 50%, preferably from 20% to 40%, of a boron-treated polyalkylene succinimide derived from polyalkylenes. Preferably, the boron-treated polyalkylene succinimide is derived from polybutenes having a molecular weight of from 1200 to 1400, most preferably about 1300.

Carbonate-Treated Polyalkylene Succinimide

The polyalkylene succinimide composition comprises from 50% to 90%, preferably from 60% to 80%, of a carbonate-treated polyalkylene succinimide derived from polyalkylenes having a molecular weight of at least 1800. Preferably, the carbonate-treated polyalkylene succinimide is a polybutene succinimide derived from polybutenes having a molecular weight of from 2000 to 2400. Preferably, it is prepared by reacting, under reactive conditions, a mixture of a polybutene succinic acid derivative, an unsaturated acidic reagent copolymer of an unsaturated acidic reagent and an olefin, and a polyamine, such as taught in U.S. Pat. No. 5,716,912.

Base Oil of Lubricating Viscosity

The base oil of lubricating viscosity used in such compositions may be mineral oils or synthetic oils of viscosity suitable for use in the crankcase of an internal combustion engine. The base oils may be derived from synthetic or natural sources. Mineral oils for use as the base oil in this invention include paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity, such as didodecyl benzene, can be used. Useful synthetic esters include the esters of mono-carboxylic acids and polycarboxylic acids, as well as monohydroxy alkanols and polyols. Typical examples are didodecyl adipate, pentaerythritol tetracaproate, di-2-ethylhexyl adipate, dilaurylsebacate, and the like. Complex esters prepared from mixtures of mono and dicarboxylic acids and mono and dihydroxy alkanols can also be used. Blends of mineral oils with synthetic oils are also useful.

Other Additive Components

The following additive components are examples of some of the components that can be favorably employed in the present invention. These examples of additives are provided to illustrate the present invention, but they are not intended to limit it:

(1) Metal detergents: sulfurized or unsulfurized alkyl or alkenyl phenates, alkyl or alkenyl aromatic sulfonates, sulfurized or unsulfurized metal salts of multi-hydroxy alkyl or alkenyl aromatic compounds, alkyl or alkenyl hydroxy aromatic sulfonates, sulfurized or unsulfurized alkyl or alkenyl naphthenates, metal salts of alkanoic acids, metal salts of an alkyl or alkenyl multiacid, and chemical and physical mixtures thereof.

(2) Oxidation inhibitors
 (a) Phenol type oxidation inhibitors: 4,4'-methylene bis (2,6-di-tert-butylphenol), 4,4'-bis(2,6-di-tert-butylphenol), 4,4'-bis(2-methyl-6-tert-butylphenol), 2,2'-methylene bis(4-methyl-6-tert-butylphenol), 4,4'-butylene bis(3-methyl-6-tert-butylphenol), 4,4'-isopropylene bis(2,6-di-tert-butylphenol), 2,2'-methylene bis(4-methyl-6-nonylphenol), 2,2'-isobutylene bis(4,6-dimethylphenol), 2,2'-methylene bis (4-methyl-6-cyclohexylphenol), 2,6-di-tert-butyl-4-methylphenol, 2,6-di-tert-butyl-4-ethylphenol, 2,4-dimethyl-6-tert-butylphenol, 2,6-di-tert-α-dimethylamino-p-cresol, 2,6-di-tert-4-(N.N'dimethylaminomethylphenol), 4,4'-thiobis(2-methyl-6-tert-butylphenol), 2,2'-thiobis(4-methyl-6-tert-butylphenol), and bis(3-methyl-4-hydroxy-5-tert-butylbenzyl)-sulfide.
 (b) Diphenyl amine type oxidation inhibitor: alkylated diphenyl amine, phenyl-α-naphthylamine, and alkylated α-naphthylamine.
 (c) Other types: metal dithiocarbamate (e.g., zinc dithiocarbamate), and methylenebis(dibutyidithiocarbamate).

(3) Rust inhibitors (Anti-rust agents)
 (a) Nonionic polyoxyethylene surface active agents: polyoxyethylene lauryl ether, polyoxyethylene higher alcohol ether, polyoxyethylene nonyl phenyl ether, polyoxyethylene octyl phenyl ether, polyoxyethylene octyl stearyl ether, polyoxyethylene oleyl ether, polyoxyethylene sorbitol monostearate, polyoxyethylene sorbitol mono-oleate, and polyethylene glycol monooleate.
 (b) Other compounds: stearic acid and other fatty acids, dicarboxylic acids, metal soaps, fatty acid amine salts, metal salts of heavy sulfonic acid, partial carboxylic acid ester of polyhydric alcohol, and phosphoric ester.

(4) Demulsifiers: addition product of alkylphenol and ethylene oxide, poloxyethylene alkyl ether, and polyoxyethylene sorbitan ester.

(5) Extreme pressure agents (EP agents): zinc dialkyldithiophosphate (primary alkyl type & secondary alkyl type), sulfurized oils, diphenyl sulfide, methyl trichlorostearate, chlorinated naphthalene, fluoroalkylpolysiloxane, and lead naphthenate.

(6) Friction modifiers: fatty alcohol, fatty acid, amine, borated ester, and other esters.

(7) Multifunctional additives: sulfurized oxymolybdenum dithiocarbamate, sulfurized oxymolybdenum organo phosphoro dithioate, oxymolybdenum monoglyceride, oxymolybdenum diethylate amide, amine-molybdenum complex compound, and sulfur-containing molybdenym complex compound.

(8) Viscosity index improvers: polymethacrylate type polymers, ethylene-propylene copolymers, styrene-isoprene copolymers, hydrated styrene-isoprene copolymers, polyisobutylene, and dispersant type viscosity index improvers.

(9) Pour point depressants: polymethyl methacrylate.

(10) Foam Inhibitors: alkyl methacrylate polymers and dimethyl silicone polymers.

Lubricating Oil Composition

The polyalkylene succinimide compositions of the present invention are useful for imparting improved soot dispersancy properties to an engine lubricating oil composition. Such a lubricating oil composition comprises a major part of base oil of lubricating viscosity and an effective amount of the polyalkylene succinimide composition of the present invention. Adding an effective amount of polyalkylene succinimide compositions of the present invention to a lubricating oil composition improves the soot dispersancy properties of that lubricating oil composition in automotive applications.

In one embodiment, an engine lubricating oil composition would contain (a) a major part of a base oil of lubricating viscosity;

(b) 1% to 20% of the polyalkylene succinimide composition of the present invention;

(c) 0% to 30% of at least one detergent;

(d) 0% to 5% of at least one zinc dithiophosphate;

(e) 0% to 10% of at least one oxidation inhibitor;

(f) 0% to 1% of at least one foam inhibitor; and (g) 0% to 20% of at least one viscosity index improver.

In a further embodiment, an engine lubricating oil composition is produced by blending a mixture of the above components. The lubricating oil composition produced by that method might have a slightly different composition than the initial mixture, because the components may interact.

The components can be blended in any order and can be blended as combinations of components. For example, the polyalkylene succinimide composition can be blended with the other components before, during, and/or after the boron-treated polyalkylene succinimide and carbonate-treated polyalkylene succinimide are blended together.

Additive Concentrates

Additive concentrates are also included within the scope of this invention. The concentrates of this invention comprise an organic diluent and the compounds or compound mixtures of the present invention, preferably with at least one of the additives disclosed above. The concentrates contain sufficient organic diluent to make them easy to handle during shipping and storage.

From 1% to 20% of the concentrate is organic diluent. From 5% to 80% of concentrate is the polyalkylene succinimide composition of the present invention. The remainder of the concentrate may comprise one or more of other additives discussed above.

These percentages are based on the amount of active and inactive components, including any process oil or diluent oil used to form that component. The percent numbers for organic diluent would be greater if only the active components are considered.

Suitable organic diluents which can be used include for example, solvent refined 100N, i.e., Cit-Con 100N, and hydrotreated 100N, i.e., Chevron 100N, and the like. The organic diluent preferably has a viscosity of about from 1 to 20 cSt at 100° C.

The components of the additive concentrate can be blended in any order and can be blended as combinations of components. For example, the polyalkylene succinimide composition can be blended with the other components before, during, and/or after the boron-treated polyalkylene succinimide and carbonate-treated polyalkylene succinimide are blended together.

Examples of Additive Packages

Below are representative examples of additive packages that can be used in a variety of applications. These representative examples employ the novel dispersants of the present invention. Unlike the percentages used in other sections of this specification, the following percentages are based on the amount of active component, with neither process oil nor diluent oil. (All process oils and diluent oils included are included in the figures for base oil of lubricating viscosity.) These examples are provided to illustrate the present invention, but they are not intended to limit it.

| | |
|---|---|
| 1) Polyalkylene succinimide composition | 35% |
| Metal detergent | 25% |
| Primary alkyl zinc dithiophosphate | 10% |
| Base oil of lubricating viscosity | 30% |
| 2) Polyalkylene succinimide composition | 40% |
| Metal detergent | 20% |
| Secondary alkyl zinc dithiophosphate | 5% |
| Dithiocarbamate type oxidation inhibitor | 5% |
| Base oil of lubricating viscosity | 30% |
| 3) Polyalkylene succinimide composition | 35% |
| Metal detergent | 20% |
| Secondary alkyl zinc dithiophosphate | 5% |
| Phenol type oxidation inhibitor | 5% |
| Base oil of lubricating viscosity | 35% |
| 4) Polyalkylene succinimide composition | 30% |
| Metal detergent | 20% |
| Secondary alkyl zinc dithiophosphate | 5% |
| Dithiocarbamate type anti-wear agent | 5% |
| Base oil of lubricating viscosity | 40% |
| 5) Polyalkylene succinimide composition | 30% |
| Metal detergent | 20% |
| Secondary alkyl zinc dithiophosphate | 5% |
| Molybdenum-containing anti-wear agent | 5% |
| Base oil of lubricating viscosity | 40% |
| 6) Polyalkylene succinimide composition | 30% |
| Metal detergent | 20% |
| Other additives | 10% |
| Primary alkyl zinc dithiophosphate | |
| Secondary alkyl zinc dithiophosphate | |
| Alkylated diphenylamine-type oxidation inhibitor | |
| Dithiocarbamate type anti-wear agent | |
| Base oil of lubricating viscosity | 40% |

EXAMPLES

The invention will be further illustrated by the following examples, which set forth particularly advantageous embodiments. While the Examples are provided to illustrate the present invention, they are not intended to limit it.

Four polybutene succinimides were prepared and post-treated by conventional means. The following percentages are based on the amount of active and inactive components, including any process oil or diluent oil used to form the polybutene succinimides.

POLYBUTENE SUCCINIMIDE A
BORATED DISPERSANT
DERIVED FROM 1300 MN POLYBUTENE

The first polybutene succinimide was derived from 1300 Mn polybutenes. This succinimide was formed by reacting polybutene-substituted succinic acid derivative with a heavy polyamine (containing an average of approximately 6.5 nitrogen atoms per mole), then post-treating the resulting polybutene succinimide with boric acid.

POLYBUTENE SUCCINIMIDE B
FIRST CARBONATED DISPERSANT
DERIVED FROM 2200 MN POLYBUTENE

The second polybutene succinimide was derived from 2200 Mn polybutenes. This was formed by reacting a polybutene-substituted succinic acid derivative with a heavy polyamine (containing an average of approximately 6.5 nitrogen atoms per mole), then post-treating the resulting polybutene succinimide with ethylene carbonate at a ratio of 2 moles of ethylene carbonate to 1 mole of basic nitrogen of the polybutene succinimide.

POLYBUTENE SUCCINIMIDE C
SECOND CARBONATED DISPERSANT
DERIVED FROM 2200 MN POLYBUTENE

The third polybutene succinimide was derived from 2200 Mn polybutenes. This was formed by reacting a mixture of a polybutene succinic acid derivative, an unsaturated acidic reagent copolymer of an unsaturated acidic reagent and an olefin, and a heavy polyamine (containing an average of approximately 6.5 nitrogen atoms per mole), then post-treating the resulting polybutene succinimide with ethylene carbonate at a ratio of 2 moles of ethylene carbonate to 1 mole of basic nitrogen of the polybutene succinimide.

POLYBUTENE SUCCINIMIDE D
CARBONATED DISPERSANT
DERIVED FROM 1300 MN POLYBUTENE

A comparative carbonated polybutene succinimide was derived from 1300 Mn polybutenes. This was formed by reacting polybutene-substituted succinic acid derivative with a mixture of 80% heavy polyamine (containing an average of approximately 6.5 nitrogen atoms per mole) and 20% diethylene triamine, then post-treating the resulting polybutene succinimide with ethylene carbonate at a ratio of 2 moles of ethylene carbonate to 1 mole of basic nitrogen of the polybutene succinimide.

Example I

Polybutene Succinimides A, B and D were each blended separately into a SAE 15W-40 Screening Formulation (X) containing an effective amount of metallic detergent, zinc dithiophosphate, and a molybdenum based oxidation inhibitor. A non-dispersant viscosity index modifier was chosen to eliminate any effects of viscosity index modifier on the test results.

These compositions were then tested in the ASTM D-5967-96 (Mack T-8) engine oil test. This test evaluates an oil's ability to control viscosity increase due to soot loading in the oil. In general, a lower viscosity increase indicates superior performance. This test is a required performance test for the heavy-duty engine oil performance category, API CG-4. The results are shown in the table below:

| Run | 1 | 2 | 3 | 4 |
| --- | --- | --- | --- | --- |
| Screening Formulation | X | X | X | X |
| Polybutene Succinimide A | 10% | | | |
| Polybutene Succinimide B | | 8% | | |
| Polybutene Succinimide B | | | 11.5% | |
| Polybutene Succinimide D | | | | 10% |
| Viscosity Increase at 3.8% soot | 9.5 cSt | 9.25 cSt | 6.9 cSt | 8.3 cSt |

Analysis of this data yields a comparison between the various components. Comparison of the results of Run 1 (borated dispersant from 1300 Mn polybutene) versus Run 4 (carbonated dispersant from 1300 Mn polybutene) shows the benefit to carbonate treatment in reducing viscosity increase. Comparison of the two results of the carbonated dispersant from 2200 Mn polybutene (Runs 2 and 3) verifies that the test result improves with increased treat level. The carbonated dispersant from 2200 Mn polybutene is superior to the borated dispersant from 1300 Mn polybutene, even at a 20% lower dosage. Because the result of Run 4 (carbonated dispersant from 1300 Mn polybutene) was intermediate to Runs 2 and 3 (carbonated dispersant from 2200 Mn polybutene), no comparison between these polybutene succinimides is possible from this data.

Example II

Polybutene Succinimides B and C were each blended separately into a Second Screening Formulation (Y) and tested in the ASTM D-5967-96 test as above, and the results tabulated below:

| Run | 5 | 6 |
| --- | --- | --- |
| Screening Formulation | Y | Y |
| Polybutene Succinimide B | 8% | |
| Polybutene Succinimide C | | 8% |
| Viscosity Increase at 3.8% soot | 8.81 cSt | 4.94 cSt |

Comparison of these results shows Polybutene Succinimide C to be superior to Polybutene Succinimide B in controlling viscosity increase. Comparing the two tables, we can infer that Polybutene Succinimide C is also superior to Polybutene Succinimide A in controlling viscosity increase.

Example III

Polybutene Succinimides A and B together (Run 7) and B alone (Run 8) were blended separately into a Commercial Formulation (Z) and again run in the ASTM D-5967-96 test as above. As previously discussed in U.S. Pat. No. 5,334,321, boration preserves the TBN contribution of the dispersant, so it was desired to keep some Polybutene Succinimide A in the final formulation:

| Run | 7 | 8 |
| --- | --- | --- |
| Screening Formulation | Z | Z |
| Polybutene Succinimide A | 3.5% | |
| Polybutene Succinimide B | 6.5% | 10% |
| Viscosity Increase at 3.8% soot | 5.85 cSt | 9.5 cSt |

Surprisingly, the mixture of borated succinimide derived from 1300 Mn polybutenes and carbonated succinimide derived from 2200 Mn polybutenes gave a lower viscosity increase than the carbonated succinimide alone, despite the fact that the carbonated succinimide has been shown to be superior to borated succinimide in controlling viscosity increase.

This Example shows the synergy of using a blend of the borated polybutene succinimide derived from 1300 Mn polybutenes and the ethylene carbonated polybutene succinimide derived from 2200 Mn polybutenes. That blend provided better soot dispersancy than achieved by using either component alone.

Example IV

Polybutene Suceinimides A and C together were blended into the same commercial formulation (Z) as in Example III with the following results, when compared to Run 6 of Example II (Formulation Y):

| Run | 9 | 6 |
|---|---|---|
| Screening Formulation | Z | Y |
| Polybutene Succinimide A | 3% | |
| Polybutene Succinimide C | 5% | 8% |
| Viscosity Increase at 3.8% soot | 4.39 cSt | 4.94 cSt |

Comparing the results of Runs 9 and 6 shows again that the mixture of borated 1300 Mn polybutene succinimide and 2200 Mn carbonated polybutene succinimide gives superior performance to either dispersant alone. While this comparison was effected in differing formulations, comparison of the Polybutene Succinimide B results from Examples II and III shows that Formulation Z is more severe in terms of viscosity increase than Formulation Y. Only 8% of the Polybutene Succinimide B in Formulation Y gave a lower viscosity increase than 10% of the same polybutene succinimide in Formulation Z.

Examples III and IV differ in how the ethylene carbonated polybutene succinimide was formed prior to post-treatment with ethylene carbonate. In Example III, that ethylene carbonated polybutene succinimide was formed by reacting polybutene-substituted succinic acid with a heavy polyamine. In Example IV, that ethylene carbonated polybutene succinimide was formed by reacting a mixture of a polybutene succinic acid derivative, an unsaturated acidic reagent copolymer of an unsaturated acidic reagent and an olefin, and a heavy polyamine. The above tables show that the second type of carbonated polybutene succinimide provided better soot dispersancy than the first type of carbonated polybutene succinimide.

Example V

The bearing weight loss of blends of borated polybutene succinimides and carbonated polybutene succinimides of different molecular weight in a standard lubricating oil formulation (Z) were compared to the bearing weight loss of standard lubricating oil formulations having only carbonated polybutene succinimides. The CRC L-38 test is a standard industry test that measures the corrosiveness of oil in terms of bearing weight loss. For the API CG-4 oil performance category, the limit is 43.7 milligrams maximum weight loss. The results are shown in the table below:

| Run | 7 | 10 | 11 | 12 |
|---|---|---|---|---|
| Screening Formulation | Z | Z | Z | Z |
| Polybutene Succinimide A | 3.5% | 3.5% | | |
| Polybutene Succinimide B | 6.5% | | 8% | |
| Polybutene Succinimide C | | 6.5% | | 8% |
| Bearing Weight Loss | 18.5 | 24 | 40.5 | 70.5 |

Note:
As dispersant level increases, the L-38 bearing weight loss increases, thus a fail at 8% would be expected to be a more severe fail at 10%.

Example V shows the benefit to the mixed dispersant approach in passivating L-38 bearing weight loss.

Comparative Example A

The ASTM D-5967-96 viscosity increase performance of a blend of borated polybutene succinimides and carbonated polybutene succinimides of the same molecular weight in a modified formulation (X') was compared to the viscosity increase performance of only borated or carbonated polybutene succinimides in Formulation X. The results are shown in the table below:

| Run | 13 | 1 | 4 |
|---|---|---|---|
| Formulation | X' | X | X |
| Component A | 3.5% | 10% | |
| Component D | 6.5% | | 10% |
| Viscosity Increase at 3.8% soot | 10.76 | 9.5 | 8.3 |

This comparative example shows that blends of borated polybutene succinimides and carbonated polybutene succinimides of the same molecular weights gave worse results than formulations having only borated or carbonated polybutene succinimides. In this example the Formulation X' differed from Formulation X in that it contained a second oxidation inhibitor. This change is not expected to impact the severity of the formulation in terms of viscosity increase.

While the present invention has been described with reference to specific embodiments, this application is intended to cover those various changes and substitutions that may be made by those skilled in the art without departing from the spirit and scope of the appended claims.

What is claimed is:

1. A polyalkylene succinimide composition comprising:
   (a) from 10% to 50% of boron-treated polyalkylene succinimide prepared by treating a first polyalkylene succinimide with a boron compound under reactive conditions; and
   (b) from 50% to 90% of carbonate-treated polyalkylene succinimide prepared by treating a second polyalkylene succinimide with a cyclic carbonate or a linear mono- or poly-carbonate under reactive conditions;
   wherein the number average molecular weight of the polyalkylenes from which the carbonate-treated polyalkylene succinimide is derived is at least 300 greater than the number average molecular weight of the polyalkylenes from which the boron-treated polyalkylene succinimide is derived.

2. A polyalkylene succinimide composition according to claim 1 wherein the difference between the number average molecular weights of the polyalkylenes is from 800 to 1000.

3. A polyalkylene succinimide composition according to claim 2 wherein the first polyalkylene succinimide is a polybutene succinimide derived from polybutenes having a number average molecular weight of from 1200 to 1400, and wherein the second polyalkylene succinimide is a polybutene succinimide derived from polybutenes having a number average molecular weight of from 2000 to 2400.

4. A polyalkylene succinimide composition according to claim 3 wherein the second polybutene succinimide is prepared by reacting a mixture under reactive conditions, wherein the mixture comprises:
   (a) a polybutene succinic acid derivative;
   (b) an unsaturated acidic reagent copolymer of an unsaturated acidic reagent and an olefin; and
   (c) a polyamine.

5. A lubricating oil formulation comprising:
   (a) a major amount of a base oil of lubricating viscosity;
   (b) from 1% to 20% of a polyalkylene succinimide composition according to claim 1;
   (c) from 0% to 30% of at least one detergent;
   (d) from 0% to 5% of at least one zinc dithiophosphate;
   (e) from 0% to 10% of at least one oxidation inhibitor;
   (f) from 0% to 1% of at least one foam inhibitor; and (g) from 0% to 20% of at least one viscosity index improver.

6. A method for improving the soot dispersancy of a lubricating oil in internal combustion engine applications, said method comprising lubricating said engine with a lubricating oil comprising an effective amount of the polyalkylene succinimide composition according to claim 1.

7. A concentrate comprising from 1% to 20% of a compatible organic liquid diluent and from 5% to 80% of the polyalkylene succinimide composition according to claim 1.

8. A method of producing a lubricating oil composition comprising blending the following components together:

(a) a major amount of a base oil of lubricating viscosity;

(b) from 1% to 20% of a polyalkylene succinimide composition according to claim 1;

(c) from 0% to 30% of at least one detergent;

(d) from 0% to 5% of at least one zinc dithiophosphate;

(e) from 0% to 10% of at least one oxidation inhibitor;

(f) from 0% to 1% of at least one foam inhibitor; and (g) from 0% to 20% of at least one viscosity index improver.

9. A lubricating oil composition produced by the method according to claim 8.

\* \* \* \* \*